A. H. W. CLEAVE.
OIL BURNER.
APPLICATION FILED APR. 21, 1914.

1,168,856.

Patented Jan. 18, 1916.

Witnesses
Lloyd Huber
Ross Thomson

Inventor
By A. H. W. Cleave
Lloyd Blackmore Atty

UNITED STATES PATENT OFFICE.

ARTHUR HAROLD WYLD CLEAVE, OF OTTAWA, ONTARIO, CANADA.

OIL-BURNER.

1,168,856.  Specification of Letters Patent.  Patented Jan. 18, 1916.

Application filed April 21, 1914. Serial No. 833,453.

*To all whom it may concern:*

Be it known that I, ARTHUR H. W. CLEAVE, a subject of the King of Great Britain, and a resident of the city of Ottawa, in the county of Carleton, in the Province of Ontario, in the Dominion of Canada, have invented certain new and useful Improvements in Oil-Burners, of which the following is a full specification.

The invention relates to atomizers to be used in combination with oil burners, as described in the present specification and illustrated in the accompanying drawings that form part of the same.

The objects of the invention are to devise an efficient atomizer of simple construction, which will mechanically atomize the oil before it enters the furnace, whereby more heat is generated, and which will consume less oil than previous oil burners of this type.

The invention consists essentially of the novel arrangement and construction of parts hereinafter described.

Figure 1:
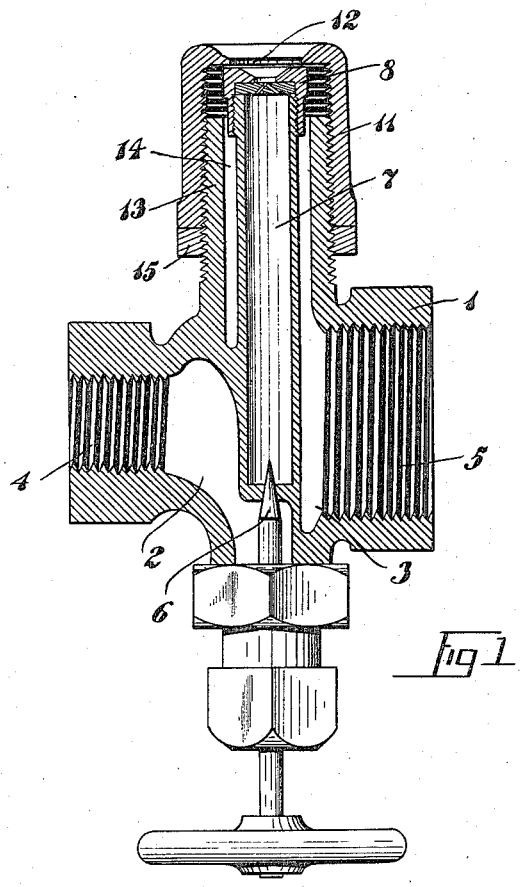
Figure 2:
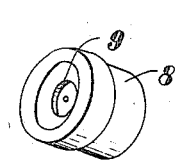
Figure 4:
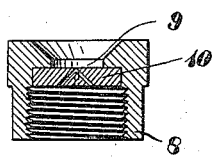
Figure 3:

Referring to the drawings Figure 1 is a sectional view of the invention. Fig. 2 is a perspective view of the cap nut and spraying disk. Fig. 3 is a perspective view of the spraying disk. Fig. 4 is a sectional view of the cap nut and spraying disk.

Like numerals of reference indicate corresponding parts in each figure.

In the drawings 1 is an oil burner having two compartments 2 and 3, said compartments having the threaded orifices 4 and 5 in which pipes may be secured, thus furnishing communication to the oil and air supply respectively.

The oil enters into compartment 2, the flow of the said oil being controlled by the needle valve 6 which closes an orifice in the lower end of the upwardly extending hollow portion 7 formed substantially in the center of the oil burner 1. The upper end of the hollow portion 7 has the cap nut 8 threaded thereon; the outer end of the cap nut has a shoulder on its inner wall against which the disk 10 rests and has the central orifice 9 therein.

10 is a spraying disk secured adjacent to the upper surface of the portion 7 by the cap nut 8. I wish to draw particular attention to the construction of said spraying disk, which forms the most valuable part of my invention. The inner side of the said spraying disk has a plurality of ducts $10^a$, shown in the drawings as four in number, the said ducts being drilled in an angular manner one to the other, whereby they meet and form a central orifice at the opposite side of the disk.

11 is a cap having the outer end surface concave, said surface having the central orifice 12 therethrough. The inner periphery of the cap is threaded to receive the upwardly extending portion 13.

14 is an annular space formed intermediate the outer and inner periphery of the extending portions 7 and 13 respectively.

It will thus be understood that the cap 11 may be readily adjusted to control the quantity of air issuing therefrom and retained in that position by the lock nut 15.

In operation the oil and air enter the orifices 4 and 5 respectively, the flow of the oil being controlled by the needle valve as hereinbefore described.

What I claim as my invention is:

1. In an oil burner, the combination of a valve casing having an outwardly-extending threaded portion, a cap threaded on said extending portion, a lock nut securing said cap on said portion, a cylindrical extending portion within the bore of said extending portion, a needle valve actuating at one end of said cylindrical portion, a spraying disk having a plurality of angularly set ducts merging into a central orifice on the outer surface thereof, and a cap nut securing said spraying disk to said cylindrical portion.

2. In an oil burner, the combination of a valve casing having an outwardly-extending threaded portion, a cap threaded on said extending portion, a cylindrical portion within the bore of said extending portion, a valve controlling the passage of fluid through said cylindrical portion, and a spraying disk at the discharge end of the cylindrical portion, said disk having a plurality of angularly set ducts merging into a central orifice on the outer surface of the disk.

ARTHUR HAROLD WYLD CLEAVE.

Witnesses:
  J. ROSS SHOMSON,
  LLOYD HUBER.